June 22, 1926.
O. L. HOWE
AUTOMOBILE
Filed March 1, 1923
1,589,393
3 Sheets-Sheet 2
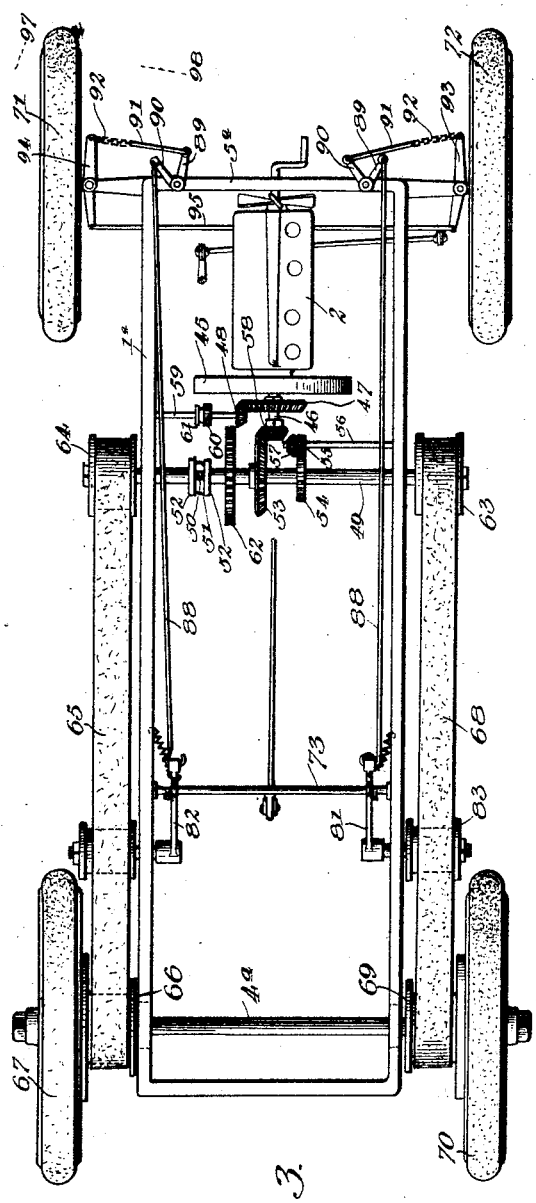
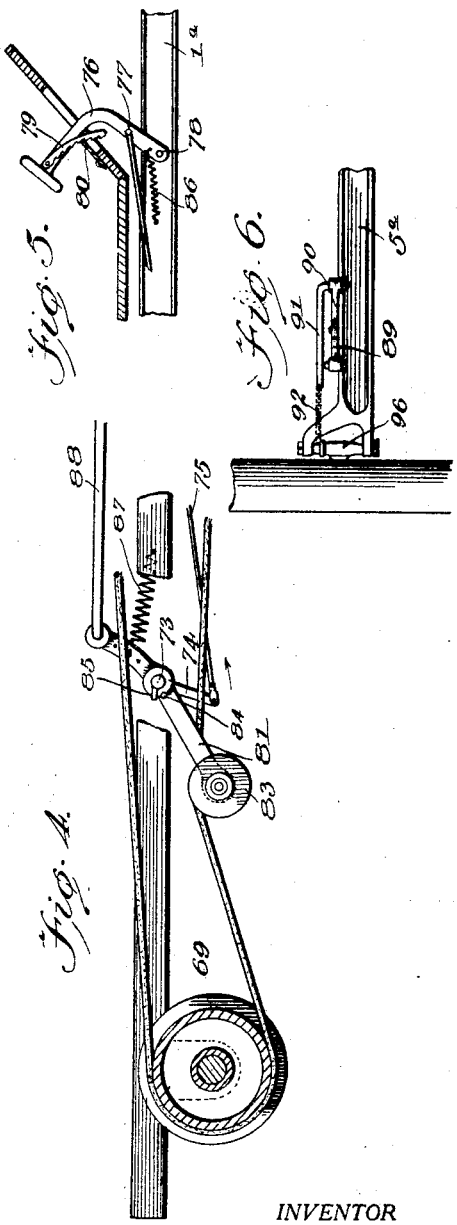
WITNESSES
INVENTOR
O. L. Howe,
BY
ATTORNEYS June 22, 1926.
O. L. HOWE
1,589,393
AUTOMOBILE
Filed March 1, 1923
3 Sheets-Sheet 3
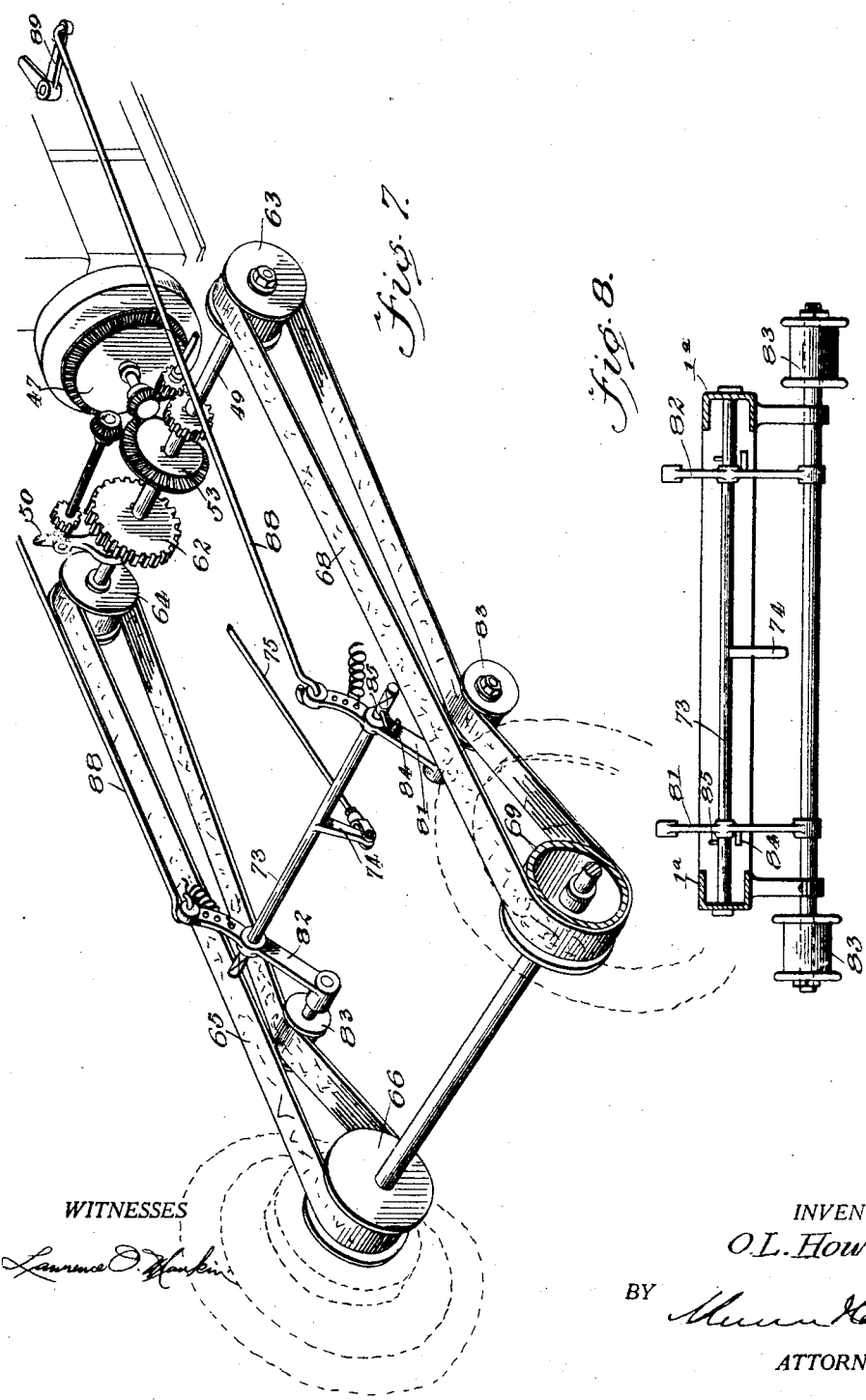
WITNESSES
INVENTOR
O.L. Howe,
BY
ATTORNEYS Patented June 22, 1926.

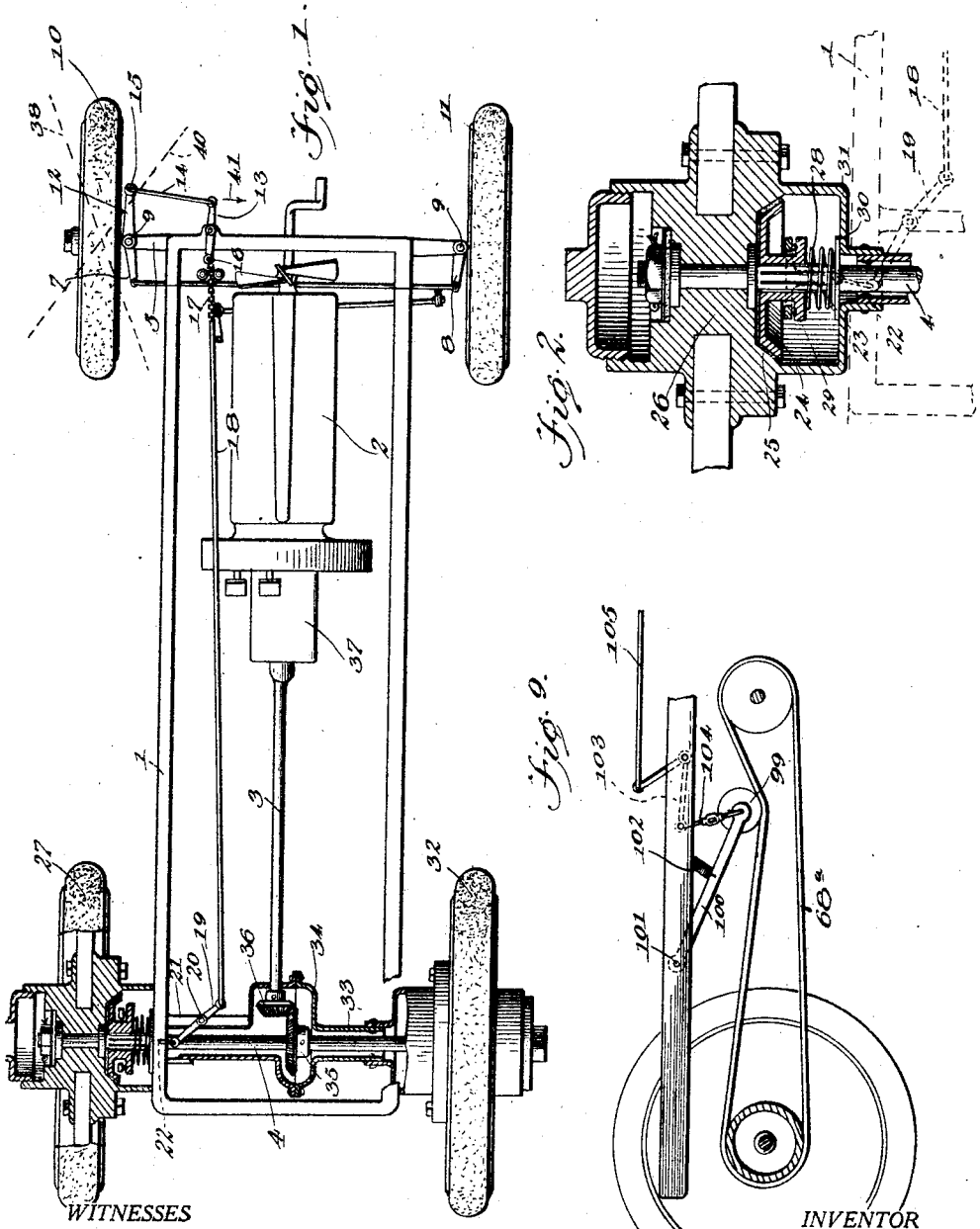

1,589,393

UNITED STATES PATENT OFFICE.

OLAF L. HOWE, OF MISSOULA, MONTANA.

AUTOMOBILE.

Application filed March 1, 1923. Serial No. 622,141.

In the present construction of automobiles, the complicated differentials require split axles, or floating or semi-floating axles with additional mechanism to complete the drive from the engine. These elements add weight necessitating a corresponding increase of engine power or loss of power and a consequent increase in the cost of the up-keep of the automobile.

It is an object of my invention to simplify the present construction by eliminating differentials and such elements as are necessarily coordinated therewith.

A further object of the invention is the provision of a combined running gear and steering mechanism in which a differential is replaced by clutches for connecting the rear wheels to the power driven axle, the clutches being automatically controlled by the steering mechanism.

Another object of the invention is the provision of a running gear in which the differential is replaced by a means for connecting the rear wheels directly with the engine but in which either one of the rear wheels is disconnected from the power driven element when turning a corner.

A still further object of the invention is the provision of a running mechanism including rear wheels power-driven by the engine and which are automatically released when the automobile turns a corner, by the steering mechanisms and a manually controlled means for disconnecting the rear wheels from the engine when the automobile is stopped.

Other objects and advantages will become apparent during the course of the following description.

The invention is illustrated by way of example in the accompanying drawings, in which, Figure 1 is a plan view of the chassis of an automobile constructed according to the principle of my invention.

Figure 2 is a horizontal transverse section of a clutch-controlled rear wheel.

Figure 3 is a plan view of a modified form of the invention.

Figure 4 is a fragmentary side view showing details of the belt tightener of the modified form.

Figure 5 is a fragmentary side view in elevation of the pedal for manually controlling the belt tightener.

Figure 6 is a fragmentary side view of the operative connection between the front wheels and the belt tightener.

Figure 7 is a view in perspective of the form shown in Figure 3.

Figure 8 is a rear view of the operating elements for automatically and manually tightening the belts.

Figure 9 is a modified form in side elevation of the belt tightener shown in Figure 4.

Referring to the drawings, 1 designates a frame upon which is mounted an internal combustion engine 2 to which is connected the drive shaft 3. The engine is shown extending longitudinally of the frame 1 and at the forward end of the same, but the engine may be mounted transversely and at the rear of the frame and adjacent the rear axle 4. The frame 1 is suspended above the front and rear axles by any form of spring construction which is well known in the art.

At the ends of the front axle 5 are mounted the usual steering knuckles 7 and 8. Spindles 9 are mounted on the ends of the front axle 5 and upon which the knuckles are rigidly mounted. The usual means are employed for connecting the front wheels 10 to the spindle 9 whereby the front wheels may be angularly moved by the ordinary steering mechanism. Rigidly connected with a member supporting the front wheels 10 and 11 from the front axle is a lever 12 extending forwardly of the front axle 5 and parallel to the vertical plane passing through the wheel 10 so that when the wheel 10 is angularly positioned the lever 12 will likewise be angularly positioned.

A second lever 13 is pivotally mounted on either the front axle or on a bracket secured to the frame 1 and has its outer end connected by means of a link 14 to the free end 15 of the lever 12. The other end of the lever 13 is connected at 16 to a flexible element 17 which is in turn connected to a reach rod 18. The rod extends longitudinally of the frame 1 and is connected at its rear end to a lever 19 pivotally mounted intermediate its ends at 20 on a bracket 21.

The other end of the lever 19 is connected through a link 22 to a pair of ears 23 mounted centrally of a cone-clutch 24. The clutch 24 is adapted to engage the female member 25 of the clutch which is formed in the hub 26 of a rear wheel 27 which is loosely mounted on the rear axle 4. The clutch member 24 being slidable on the axle is adapted to be forced into engagement with the members 25 of the clutch by a spring 28. The spring 28 presses against a ball bearing 29 at one end, its other end being in engagement with a disc 30 which is in engagement with a cap 31 enclosing the clutch members and which is secured to the hub 26 of the wheel 27.

The other rear wheel 32 is rigidly connected with the shaft 4. A housing 33 embraces the shaft 4 and has an enlarged portion at 34 in which is mounted a large bevel gear 35 that is pinned to the shaft 4. A smaller bevel gear 36 in mesh with the gear 35 is mounted on the rear end of the drive shaft 3 and within the enlarged portion of the housing 33. The transmission and clutch enclosed within the housing 37 is connected with the shaft of the engine 2 and is adapted to transmit the various speeds to the driving axle 4 with the clutch acting to connect or disconnect the drive shaft 3 with the crank shaft.

The operation of my device as disclosed in Figures 1 and 2 is as follows:

The spring 28 normally maintains the clutch member 24 in engagement with the clutch member 25 whereby the wheel 27 is locked to the driving axle 4. The wheel 32 is rigidly connected with the axle 4. When the engine has been started and the usual clutch mechanism and transmission has been adjusted for operating the drive shaft 3, the rear axle 4 is driven and likewise the wheels 37 and 32 propelling the automobile and since the clutch 24 has locked the rear wheel 27 to the axle 4 both wheels will act as the driving means. When it is desired to turn a corner, the steering mechanism is properly operated for causing the front wheels to be angularly disposed relative to the axle 5 as indicated by the dotted line shown at 38, the lever 12 will be likewise positioned in the same direction thereby pulling on the forward end of the lever 13, causing a pull on the rod 18 and one end of the lever 19 whereby the clutch member 24 is released from the member 25 of the clutch so that the rear wheel 24 has been disengaged from the axle 4 and the wheel 32 propels the automobile forwardly and around the corner.

When the front wheel 10 is moved in the direction indicated by the arrow 40 the lever 12 will likewise be moved in that direction thereby pushing the forward end of the lever in a direction indicated by the arrow 41. This exerts a pull on the rod 18 and the forward end of the lever 19, when the clutch member 24 is again released from the clutch member 25. The wheel 27 is then released from the axle 4 whereby the power from the engine is transmitted only to the rear wheel 32. It will be seen by this construction the usual differential mechanism as applied to the rear axles of an automobile is eliminated and that the disengagement of the wheel 27 at all times when the automobile is turning a corner is entirely automatic and controlled by the movement of the front wheel 10.

It is to be understood that while I have shown the clutch mechanisms 24 and 25 as applied to one rear wheel 27 that a similar clutch mechanism may be applied to the rear wheel 32 and operated by the front wheel 11 or that both clutch mechanism for the rear wheels may be simultaneously operated by a unitary structure connected directly with both front wheels.

Referring to Figures 3 to 9 inclusive, a modified form of the invention is disclosed whereby the usual differential is eliminated and in which the controlling means for releasing one or both of the rear wheels from the power as distributed from the engine is automatically controlled by the movement of the front wheels so that the same effect of the differential will be had to permit the car to normally turn a corner without in any manner throwing the strain upon the rear axle.

Referring more particularly to Figure 3 $1^a$ designates the frame which is spring-suspended in the usual manner above the front and rear axles respectively $5^a$ and $4^a$. An engine 2 is mounted in the frame 1 in the usual manner. A fly wheel 45 is connected to the crank shaft 46 of the engine upon which is mounted a bevelled gear 47 adapted to constantly mesh with a small bevelled gear 48. A transverse shaft 49 is mounted on the frame $1^a$ and is slidable transversely of the frame by means of a rocker arm 50, said arm being provided with a fork 51 located between a pair of collars 52. A bevelled gear 53 is rigidly connected with the shaft 49 as is a spur gear 54 and these gears are likewise slidable with the shaft 49. Meshing with the spur gear 54 is a smaller spur gear 55 mounted on a shaft 56. Said shaft is adapted to be connected for slidable movement with the shaft 49 so that the gears 54 and 55 will always be in mesh and slidable simultaneously when the shaft 49 is moved in the direction indicated by the arrow in full lines and for moving the spur gear 57, which is mounted on the shaft 56, in engagement with the small spur gear 58 mounted on the outer end of the crank shaft 46. When the gears 54, 55 and 57 are moved in this direction, the gear 53 is moved out of engagement with the gear 58.

Upon a shaft 59 is slidably mounted by means of a keyway a spur gear 60 adapted to be moved by means of a rocker lever engaging the grooved collar 61 and into engagement with the spur gear 62. While the gear 62 is mounted on the shaft 49 the same is not slidable with said shaft. The gear 48 is rigidly mounted on the shaft 59 so that the shaft 59 is always rotated with the gear 47 and the gear 60 and when the gear 60 is moved into mesh with the gear 62 the gear 62 will likewise be driven. The gear 62 while not slidable with the shaft 49 is adapted to be keyed to the shaft 49 so that the gear 62 will drive said shaft. When the gear 54 is driven by means of the gears 55, 57 and 58, the shaft 49 will be driven at high speed. When the gear 58 is in mesh with the gear 53 the shaft will be driven at low speed. When the gear 60 is moved into mesh with the gear 62 the reverse speed will be had. Other speeds may be added by the employment of a combination of gears.

On the end of the slidable shaft 49 are mounted pulleys 63 and 64. A belt 65 engages the pulley 64 and a pulley 66 connected with the hub of the rear wheel 67. A belt 68 engaging the pulley 63 drives a pulley 69 connected with the hub of the rear wheel 70. The rear wheels 67 and 70 are loosely mounted on the rear axle 4ª. The belts 65 and 68 are sufficiently loose when the front wheels 71 and 72 are in parallel relation and in substantial alinement with the respective rear wheels 67 and 71 that the shaft 49 may be driven by the engine and the respective belts will slip upon the pulleys without tending to drive the rear wheels.

When it is desired to propel the automobile belt tighteners are employed for causing the belts 65 and 68 to grip the respective pulleys and cause rotation of the wheels 67 and 70.

A rod 73 is mounted for rotation in bearings at its opposite ends in the frame 1ª. A lever 74 is rigidly connected with the rod 73 and depending below the same. A link 75 connects the lever 74 with a foot lever 76 at a point 77 intermediate the ends of said foot lever. The foot lever is pivoted at 78 on the frame 1ª. A ratchet bar 79 connected with the foot lever is adapted to engage a pawl 80 which will maintain the lever in a depressed position.

Rocking levers 81 and 82 are pivotally mounted on the rod 73 intermediate their ends. On the lower end of each rock lever is provided a pulley 83 which is adapted to be moved up into engagement with the respective belts 65 and 68. A lug 84 is mounted on the lever 81 and below its pivotal point on the rod 73 and is adapted to be engaged by a lug 85 on the rod 73 so that when the lever 74 is moved in the direction indicated by the arrow by the depression of the foot lever 76, the lug 85 engages the lug 84 and moves the rollers 83 from their respective belts 65 and 68, thereby loosening the belts. When the pawl 80 is released from the ratchet bar 78 a spring 86 will force the foot lever 76 in its most elevated position while springs 87, connected with the levers 81 and 82, will force the lower end of said levers and the pulleys 83 up into engagement with the respective belts and thereby tighten the belt and cause the same to drive the pulleys 66 and 69. The upper end of the lever 81 is connected by means of a link 88 to one end 89 of a bell crank lever which is pivotally mounted on the front axle 5ª. The other end 90 of said bell crank lever is connected by means of a link 91, having a flexible member 92, to a lever 93. Said lever is rigidly connected with the steering knuckle of the wheel 72 as that when the wheel 72 is angularly moved with respect to the axle 5ª the lever 93 will likewise be moved and operate the bell crank lever.

A similar link 83 connects the rocking lever 82 with a second bell crank lever having arms 89 and 90 and pivotally mounted on the front axle 5ª adjacent the front wheel 71. A link 91 and a flexible member 92 connect the bell crank lever with a lever 94 rigidly connected with the steering knuckle of the wheel 71. The usual steering mechanism 95 is shown connected with the front wheels for causing simultaneous angular movement of said wheels for turning corners. A spindle 96 is shown pivotally mounted on the end of the axle 5ª and forms part of the steering knuckle.

In turning a corner in the direction indicated by the arrow in dotted lines as shown at 97, the lever 94 connected with the steering wheel adjacent the front wheel 71 will be moved in the direction indicated by the arrow 97 thereby pulling on the arm 89 of the bell crank lever, forcing the link 83 rearwardly and likewise the upper end of the lever 82. The lower end of the lever will be moved forwardly and thereby carry the pulley 83 away from the belt 65 and release said belt so that the belt will slide over pulleys 66 and will not tend to drive the wheel 67. The front wheel 72 is likewise moved in the same direction, but due to the flexible element 92 the spring 87 maintains the pulley 83 in engagement with the belt 68 and thereby causes the belt 68 to drive the rear wheel 70. When the wheels are turned in the direction as indicated by the arrow shown at 98 the lever 93 will be moved in that direction thereby exerting a pull on the respective link 91 and pulling the link 83 backwardly and likewise the upper end of the lever 81. The pulley 83 will be released from the belt 68 thereby relieving the power form the rear wheel 70 while the power is still retained on the rear wheel 67 since the flexible element 92 connected with the lever 94 does not disturb the pulley 83 and therefore said pulley is maintained in engagement with the belt 65.

It will be seen that the foot pedal 76 may be depressed and cause the pulleys 83 of the respective rock levers 81 and 82 to be released from the belts without effecting the other connections whereby the belt tighteners are automatically operated by the front wheels.

A modified form of the belt tightener shown in Figure 9 in which the belt 68ª is tightened through the pulley 99 which is mounted at one end of the lever 100 pivoted at 101 on the frame 1ᵇ. A spring 102 tends to maintain the pulley 99 always in engagement with the belt 68ª. A bell crank lever 103 is connected by means of a link 104 with the pulley 99 for moving said pulley in engagement or releasing said pulley from the belt 68ª. A link 105 is adapted to be connected with either of the levers 93 or 94.

The weight of the automobile is directly carried by the live axle 4 as shown in Figure 1 instead of being carried by a housing which is usual in automobile constructions, thereby eliminating the necessity of employing a very heavy or durable housing for the purpose.

As shown in Figure 3, the weight of the automobile is carried directly by the axle 4ª and since the axle is dead no housing at all is required.

What I claim is:

In an automobile, a running gear including front and rear axles and wheels mounted on said axles, a frame connecting the axles, a shaft mounted transversely of the frame, an engine, means operatively connecting the engine with the shaft, pulleys on the shaft, belts operatively connecting the pulleys on the shaft with the rear wheels, a rock shaft mounted on the frame, levers pivotally mounted on the rock shaft and provided with belt tighteners, springs for causing the levers to force the belt tighteners in engagement with the belts for driving the wheels, a lever rigidly connected with the rock shaft, lugs projecting from the rock shaft, other lugs propecting from the levers adapted to be engaged by the lugs on the rock shaft for forcing the belt tighteners away from the belts, a foot pedal, a link connecting the foot pedal with the lever depending from the rock shaft for operating said depending lever, and means connecting the levers carrying the belt tighteners with the front wheels whereby angular movement of said wheels will alternately release the belt tighteners from the belts.

OLAF L. HOWE.